(12) United States Patent
Kim et al.

(10) Patent No.: US 12,174,684 B2
(45) Date of Patent: Dec. 24, 2024

(54) ELECTRONIC DEVICE AND CONTROL METHOD THEREOF

(71) Applicant: SAMSUNG ELECTRONICS CO., LTD., Suwon-si (KR)

(72) Inventors: Heetae Kim, Suwon-si (KR); Soongyu Kwon, Suwon-si (KR); Minsung Kim, Suwon-si (KR); Minsu Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 38 days.

(21) Appl. No.: 18/079,878

(22) Filed: Dec. 13, 2022

(65) Prior Publication Data

US 2023/0106563 A1 Apr. 6, 2023

Related U.S. Application Data

(63) Continuation of application No. PCT/KR2021/003199, filed on Mar. 16, 2021.

(30) Foreign Application Priority Data

Jul. 3, 2020 (KR) .......... 10-2020-0082136

(51) Int. Cl.
*G06F 1/324* (2019.01)
*G06F 1/3212* (2019.01)

(52) U.S. Cl.
CPC .......... *G06F 1/324* (2013.01); *G06F 1/3212* (2013.01)

(58) Field of Classification Search
CPC ...... G06F 1/3212; G06F 1/3237; G06F 1/324; G06F 1/3243; G06F 1/24; G06F 1/28; G06F 1/30
See application file for complete search history.

(56) References Cited

U.S. PATENT DOCUMENTS

| 4,970,679 | A |   | 11/1990 | Tachibana |
| 5,655,009 | A | * | 8/1997  | Arai ....................... H04M 11/06 |
|           |   |   |         | 379/93.28 |

(Continued)

FOREIGN PATENT DOCUMENTS

| JP | 5-282067 A  | 10/1993 |
| KR | 87-11021 U  | 7/1987  |

(Continued)

OTHER PUBLICATIONS

International Search Report mailed Jul. 1, 2021 for PCT/KR2021/003199.

*Primary Examiner* — Thomas J. Cleary
(74) *Attorney, Agent, or Firm* — CANTOR COLBURN LLP

(57) ABSTRACT

An electronic device includes a processor including a central processing unit (CPU) and a plurality of intellectual property (IP) blocks and a memory operationally connected with the processor. The memory stores one or more instructions, when executed, causing the processor to obtain a first voltage level of the electronic device, decrease a clock frequency of a first clock, which is a clock signal supplied to the CPU, when the obtained first voltage level is less than or equal to a specified first threshold voltage, and decrease at least one maximum clock frequency selected from a plurality of maximum clock frequencies, which is set in the CPU and the plurality of IP blocks, when the obtained first voltage level is less than or equal to the first threshold voltage after a first time elapses.

14 Claims, 9 Drawing Sheets

(56) References Cited

U.S. PATENT DOCUMENTS

| | | | |
|---|---|---|---|
| 6,272,666 B1 * | 8/2001 | Borkar | G01R 31/3016 |
| | | | 716/113 |
| 6,441,661 B1 | 8/2002 | Aoki et al. | |
| 7,164,409 B2 | 1/2007 | Pasqualini et al. | |
| 8,570,260 B2 | 10/2013 | Hedtke et al. | |
| 8,689,023 B2 | 4/2014 | Gupta et al. | |
| 8,775,854 B2 * | 7/2014 | Sutardja | G06F 1/305 |
| | | | 713/500 |
| 9,307,495 B2 | 4/2016 | Valentine | |
| 9,831,701 B2 | 11/2017 | Valentine | |
| 10,383,062 B2 | 8/2019 | Heo et al. | |
| 10,627,883 B2 | 4/2020 | Mehra et al. | |
| 10,635,159 B2 | 4/2020 | Kolla et al. | |
| 11,122,513 B2 | 9/2021 | Heo et al. | |
| 11,126,246 B2 | 9/2021 | Han et al. | |
| 11,402,413 B1 * | 8/2022 | Mohan | G06F 1/3296 |
| 2005/0219197 A1 | 10/2005 | Pasqualini et al. | |
| 2007/0085807 A1 | 4/2007 | Hedtke | |
| 2007/0263416 A1 * | 11/2007 | Tsai | G06F 1/3203 |
| | | | 363/21.06 |
| 2010/0207913 A1 | 8/2010 | Hedtke et al. | |
| 2011/0115567 A1 | 5/2011 | Sutardja | |
| 2011/0153145 A1 | 6/2011 | Kettenacker | |
| 2013/0063097 A1 | 3/2013 | Valentine | |
| 2013/0093505 A1 | 4/2013 | Gupta et al. | |
| 2015/0208356 A1 * | 7/2015 | Niu | H04W 52/0277 |
| | | | 455/574 |
| 2016/0054776 A1 * | 2/2016 | Lu | G06F 1/10 |
| | | | 713/322 |
| 2016/0066280 A1 * | 3/2016 | Heo | H04W 52/0287 |
| | | | 455/574 |
| 2016/0070330 A1 * | 3/2016 | Yang | H04W 52/0277 |
| | | | 713/320 |
| 2016/0172879 A1 | 6/2016 | Valentine | |
| 2017/0168514 A1 * | 6/2017 | Mittal | G06F 1/3206 |
| 2017/0250450 A1 * | 8/2017 | Xie | H01M 10/4257 |
| 2017/0261537 A1 * | 9/2017 | Chong | G01R 31/3004 |
| 2017/0344102 A1 | 11/2017 | Kolla et al. | |
| 2018/0018009 A1 | 1/2018 | Kommrusch et al. | |
| 2018/0336146 A1 * | 11/2018 | Blodgett | G06F 1/188 |
| 2019/0129490 A1 | 5/2019 | Han et al. | |
| 2019/0265767 A1 | 8/2019 | Mehra et al. | |
| 2019/0265769 A1 * | 8/2019 | Gelman | H03K 5/01 |
| 2020/0089299 A1 * | 3/2020 | Kim | H03L 7/097 |
| 2021/0018971 A1 * | 1/2021 | Rotem | G06F 1/263 |
| 2021/0382805 A1 * | 12/2021 | Gendler | G06F 9/4403 |
| 2021/0385754 A1 | 12/2021 | Heo et al. | |
| 2021/0389815 A1 | 12/2021 | Han et al. | |

FOREIGN PATENT DOCUMENTS

| | | |
|---|---|---|
| KR | 88-14741 A | 12/1988 |
| KR | 93-11449 A | 6/1993 |
| KR | 2000-0032874 A | 6/2000 |
| KR | 2001-0053333 A | 6/2001 |
| KR | 10-2004-0105221 A | 12/2004 |
| KR | 10-0681558 B1 | 2/2007 |
| KR | 10-0755875 B1 | 9/2007 |
| KR | 10-2012-0095901 A | 8/2012 |
| KR | 10-2016-0025145 A | 3/2016 |
| KR | 10-2019-0048204 A | 5/2019 |

* cited by examiner

ELECTRONIC DEVICE AND CONTROL METHOD THEREOF

CROSS-REFERENCE TO RELATED APPLICATION

This application is a continuation of International Application No. PCT/KR2021/003199 designating the United States, filed on Mar. 16, 2021, which claims priority to Korean Patent Application No. 10-2020-0082136, filed on Jul. 3, 2020, in the Korean Intellectual Property Office, the content of which in its entirety is herein incorporated by reference.

BACKGROUND

1. Field

Various embodiments disclosed in the disclosure relate to an electronic device and a control method of the electronic device.

2. Description of the Related Art

Sudden momentary power loss (SMPL) reset may be applicable to an electronic device such as a portable terminal. The SMPL reset may be a method for blocking power supplied to the electronic device to turn off the electronic device, when current flowing in the electronic device is greater than a specified value. The SMPL reset may be one of power-off simulations for turning off the electronic device when the voltage of the battery of the electronic device is less than or equal to a specified value. The SMPL reset may prevent a circuit and the battery of the electronic device from being damaged when a short circuit occurs in the circuit and/or the battery in the electronic device or a load current of the electronic device flows excessively.

Furthermore, an auto ship mode may be applicable to the electronic device including the battery. The auto ship mode may be a technology for turning off the electronic device when the capacity of the battery of the electronic device is less than or equal to a specified value. The auto ship mode may prevent swelling of the battery. The auto ship mode may increase a period of time when the electronic device is able to be stored until the electronic device is manufactured and delivered to a user.

When the SMPL rest and/or the auto ship mode occurs while the electronic device is in use, because the electronic device is turned off while the electronic device is in use, inconvenience may occur in the use of the user. An SMPL warning function may be applied to decrease that the SMPL reset and/or the auto ship mode occurs while the electronic device is in use. The SMPL warning function may be a function where a processor controls a clock supplied to a central processing unit (CPU) in hardware before the voltage of the battery of the electronic device drops less than or equal to a value where the SMPL rest occurs to prevent the SMPL reset.

SUMMARY

An SMPL warning function may control a clock of a processor once in hardware before a voltage of a battery of an electronic device reaches a value where SMPL reset occurs. The SMPL warning function may prevent SMPL rest once when the voltage of the battery of the electronic device momentarily decreases. When a load current flowing in the electronic device is continuously greater than or equal to a specified value, the voltage of the battery of the device may be continuously less than or equal to a specified value. In a situation where the voltage of the battery of the electronic device is continuously less than or equal to the specified value, it may not be easy to prevent the SMPL reset using an SMPL warning function. Thus, as the electronic device may be turned off by the SMPL rest while the electronic device is in use, the usage stability of the electronic device may decrease.

Furthermore, direct current resistance (DCR) of the battery of the electronic device may increase in a low temperature environment. In the low temperature environment, as DCR increases, the voltage of the battery may be continuously less than or equal to the specified value although a load current does not increase. In the low temperature environment, as the voltage of the battery remains less than or equal to the specified value, the auto ship mode may occur. In the low temperature environment, it may not be easy to decrease turn-off the electronic device by the auto ship mode using the SMPL warning function.

Furthermore, the SMPL warning function may control a clock supplied to a CPU of the processor. As current flowing in other IP blocks of the processor, for example, a graphic processing unit (GPU), a neural processing unit (NPU), and a bus, or another component of the electronic device, for example, a display, increases, when a voltage drop increases, the voltage of the battery may drop less than or equal to the specified value. As current flowing other IP blocks of the processor increases, when the voltage of the battery drops less than or equal to the specified value, it may not be easy for the SMPL warning function to prevent the SMPL reset.

Various embodiments disclosed in the disclosure are to provide an electronic device for preventing the electronic device from being turned off by SMPL reset even in a situation where a voltage of a battery of the electronic device is continuously less than or equal to a specified value.

In accordance with an embodiment of the disclosure, an electronic device is provided. In such an embodiment, the electronic device includes a processor including a central processing unit (CPU) and a plurality of intellectual property (IP) blocks and a memory operationally connected with the processor, wherein the memory stores one or more instructions, when executed, causing the processor to obtain a first voltage level of the electronic device at a first time point; decrease a clock frequency of a first clock, which is a clock signal supplied to the CPU, when the obtained first voltage level is less than or equal to a specified first threshold voltage; and obtain a second voltage level of the electronic device at a second time point after a first time elapses; decrease at least one maximum clock frequency selected from a plurality of maximum clock frequencies, which are set in the CPU and the plurality of IP blocks, when the obtained second voltage level is less than or equal to the first threshold voltage.

In accordance with another embodiment of the disclosure, a control method of an electronic device is provided. In such an embodiment, the control method includes obtaining a first voltage level of the electronic device at a first time point; decreasing a clock frequency of a first clock, which is a clock signal supplied to a CPU of a processor of the electronic device, when the obtained first voltage level is less than or equal to a specified first threshold voltage; and obtaining a second voltage level of the electronic device at a second time point after a first time elapses; decreasing at least one maximum clock frequency selected from a plurality of maximum clock frequencies, which are set in the CPU and a plurality of IP blocks of the processor, when the obtained second voltage level is less than or equal to the first threshold voltage.

According to embodiments, as described herein, when a voltage level of a battery of an electronic device is less than or equal to a first voltage, a maximum clock frequency set by means of dynamic voltage frequency scaling may decrease. When the voltage level of the battery maintains a first voltage or less, the maximum clock frequency may decrease to decrease a voltage level drop of the battery. The voltage level drop of the battery may decrease to maintain a voltage level of the battery to be higher than a value where SMPL reset occurs, thus decreasing the SMPL reset occurrence. Thus, a phenomenon where the electronic device is turned off while the electronic device is in use may decrease to increase the usage stability of the electronic device.

Furthermore, according to embodiments, as described herein, in a low temperature environment, SMPL reset occurrence may decrease even when the voltage of the battery remains less than or equal to a specified value.

Furthermore, according to embodiments disclosed in the disclosure, as current flowing in other IP blocks of the processor or another component of the electronic device, for example, a display, increases, a voltage drop increases. Accordingly, even when the voltage of the battery drops less than or equal to a specified value, SMPL reset occurrence may decrease.

In addition, various effects ascertained directly or indirectly through the disclosure may be provided.

BRIEF DESCRIPTION OF THE DRAWINGS

With regard to description of the drawings, identical or similar reference numerals may be used to refer to identical or similar components.

DETAILED DESCRIPTION

Figure 1:
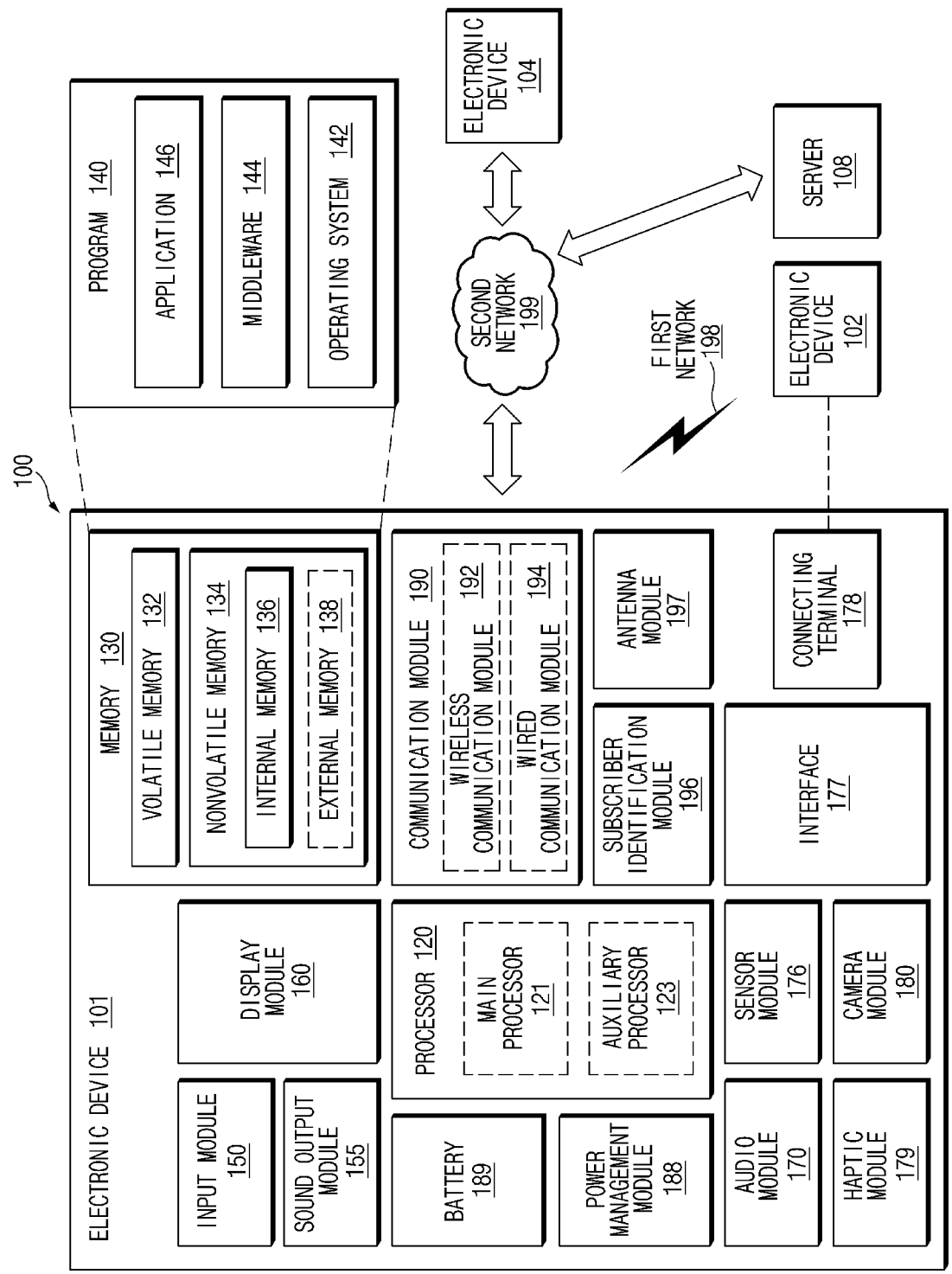
FIG. 1 is a block diagram illustrating an electronic device 101 in a network environment 100 according to various embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, various embodiments of the disclosure will be described in detail with reference to the accompanying drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an alternative embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
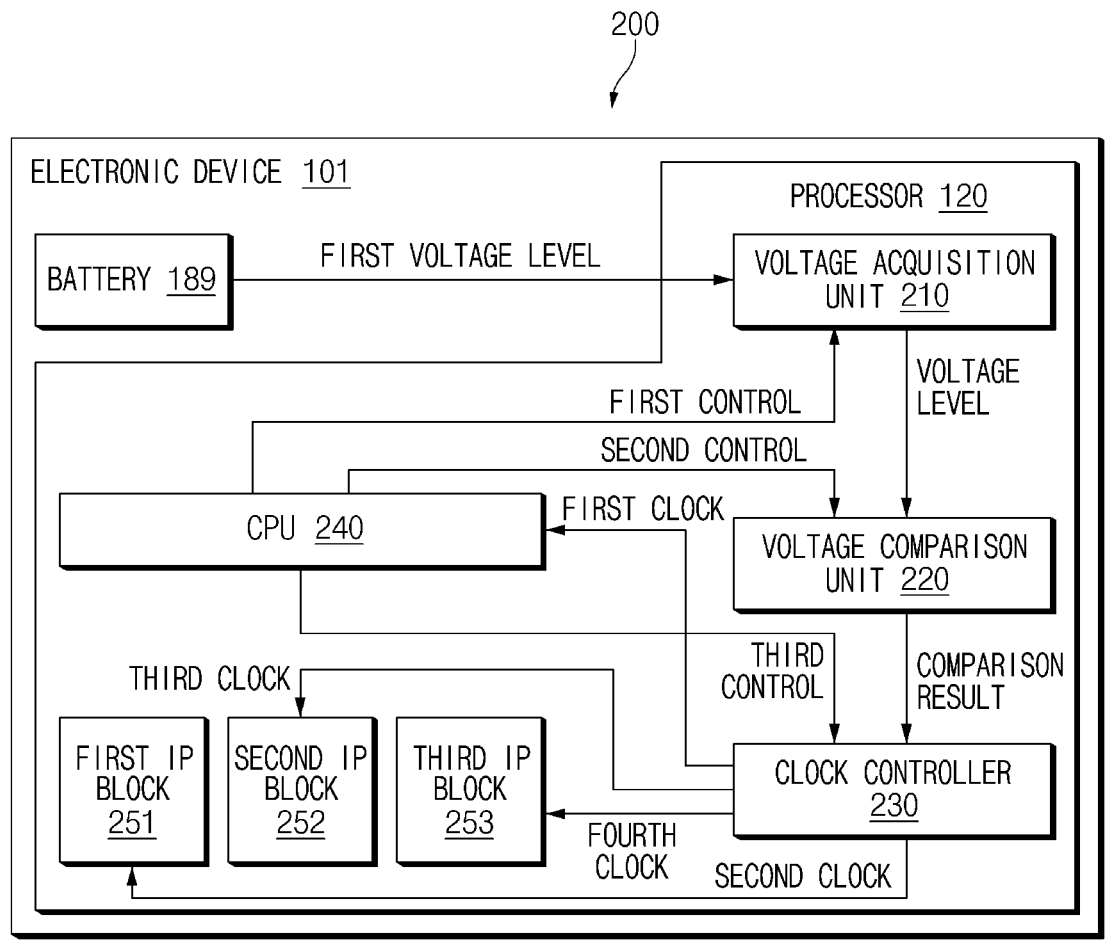
FIG. 2 is a drawing illustrating an electronic device including a battery and a processor according to an embodiment.

FIG. 2 is a drawing 200 illustrating an electronic device 101 including a battery 189 and a processor 120 according to an embodiment. The processor 120 may be operationally connected with the battery 189. The processor 120 according to an embodiment may include a voltage acquisition unit 210, a voltage comparison unit 220, a clock controller 230, a central processing unit (CPU) 240, a first intellectual property (IP) block 251, a second IP block 252, and/or a third IP block 253. The first IP block 251, the second IP block 252, and/or the third IP block 253 may be circuit(s), element(s), module(s), and/or buses for performing a specified function in the processor 120 configured as a system on chip (SOC). The first IP block 251 may be a graphic processing unit (GPU). The second IP block 252 may be a neural processing unit (NPU). The third IP block 253 may be a bus. However, the processor 120 is not limited thereto, and may alternatively or further include a plurality of IP blocks such as a multimedia card (MMC) and/or universal flash storage (UFS). According to an embodiment, the processor 120 may be an application processor (AP).

In an embodiment, the third IP block 253 (e.g., the bus) may include a group of signal lines for data communication. For example, the third IP block 253 may include at least one selected from an address bus, a data bus and a control bus, or a combination of two or more thereof.

According to an embodiment, the voltage acquisition unit 210 may be subject to first control from the CPU 240 (e.g., a main processor 121 of FIG. 1). The first control may be performed by means of (or using) an interrupt handler. The interrupt handler may be executed in software by the CPU 240. The voltage acquisition unit 210 may obtain (e.g., detect or measure) a first voltage level. The first voltage level may be a voltage level of the battery 189. The voltage acquisition unit 210 may be connected with the battery 189. The voltage acquisition unit 210 may receive information associated with the first voltage level. The voltage acquisition unit 210 may be a voltage measurement circuit branched from an output terminal of the battery 189. The processor 120 may measure a voltage of the output terminal of the battery 189 using the voltage acquisition unit 210. The processor 120 may obtain the first voltage level of electronic device 101 using the voltage acquisition unit 210.

In an embodiment, the voltage acquisition unit 210 may be subject to second control from the CPU 240. The second control may be performed by means of the interrupt handler. The voltage comparison unit 220 may receive the first voltage level of the electronic device 101, which is obtained by the voltage acquisition unit 210. The voltage comparison unit 220 may compare the received first voltage level with a first threshold voltage which is a set voltage level. The first threshold voltage may be a voltage level which is less than or equal to the voltage level of the battery 189 when the electronic device 101 performs a general operation. The first threshold voltage may be a voltage level which is greater than or equal to the voltage level of the battery 189, in which sudden momentary power loss (SMPL) reset occurs. The SMPL reset may be a method for blocking power supplied to an electronic device to turn off the electronic device when current flowing in the electronic device is greater than a specified value. The first threshold voltage may be a voltage level which is greater than or equal to the voltage level of the battery 189, in which an auto ship mode is generated. The auto ship mode may be a technology for turning off an electronic device when the capacity of a battery of the electronic device is less than or equal to a specified value. The voltage comparison unit 220 may deliver the result of comparing the first voltage level with the first threshold voltage to the clock controller 230.

In an embodiment, the voltage acquisition unit 210 may be subject to second control from the CPU 240. The second control may be performed by means of the interrupt handler. The clock controller 230 may receive the result of comparing the first voltage level with the first threshold voltage. The clock controller 230 may set a maximum clock frequency of a first clock, a maximum clock frequency of a second clock, a maximum clock frequency of a third clock, and/or a maximum clock frequency of a fourth clock. The first clock may be a clock signal supplied to the CPU 240. The second clock may be a clock signal supplied to the first IP block 251. The third clock may be a clock signal supplied to the second IP block 252. The fourth clock may be a clock signal supplied to the third IP block 253. In an embodiment, the maximum clock frequency may be a maximum clock frequency value set by means of dynamic voltage frequency scaling (DVFS) in a frequency range of the clock signal. The maximum clock frequency may be a maximum clock frequency value of a DVFS policy applied to a CPU and/or an IP block to which the clock signal is supplied. Alternatively, the maximum clock frequency may be a maximum value set independently of the DVFS itself.

In an embodiment, when the first voltage level is less than or equal to the specified first threshold voltage, the processor 120 may decrease a clock frequency of the first clock which is a clock signal supplied to the CPU 240 of the processor 120. When the first voltage level becomes less than or equal to the first threshold voltage, the processor 120 may decrease the clock frequency of the first clock. When the first voltage level is less than or equal to the first threshold voltage, the processor 120 may decrease the clock frequency of the first clock by a value stored in a register in the processor 120 or a set rate. In an embodiment, for example, when the first voltage level is less than or equal to the first threshold voltage, the processor 120 may decrease the clock frequency of the first clock by half. In an alternative embodiment, for example, when the first voltage level is less than or equal to the first threshold voltage, the processor 120 may decrease the clock frequency of the first clock by $1/3$, $2/3$, $1/4$, $3/4$, $1/5$, $2/5$, $3/5$, or $4/5$.

In an embodiment, the clock controller 230 may be subject to third control from the CPU 240. The third control may be performed by means of the interrupt handler.

In an embodiment, when the first voltage level is less than or equal to the first threshold voltage after a first time elapses, the CPU 240 may control the clock controller 230 to decrease at least one maximum clock frequency selected from the plurality of maximum clock frequencies set by means of the DVFS. The processor 120 may decrease at least one maximum clock frequency selected from maximum clock frequencies of the CPU 240 and/or each of the plurality of IP blocks (e.g., the first IP block 251, the second IP block 252, and the third IP block 253), when the first voltage level is less than or equal to the first threshold voltage after the first time elapses, using the CPU 240. The CPU 240 may decrease at least one of a first maximum clock frequency, a second maximum clock frequency, a third maximum clock frequency, and/or a fourth maximum clock frequency, when the first voltage level is less than or equal to the first threshold voltage after the first time elapses, using the interrupt handler.

In an embodiment, the CPU 240 may set each of the plurality of maximum clock frequencies by means of the DVFS. The first maximum clock frequency may be a maximum clock frequency set in the CPU 240. The second maximum clock frequency may be a maximum clock frequency set in the first IP block 251. The third maximum clock frequency may be a maximum clock frequency set in the second IP block 252. The fourth maximum clock frequency may be a maximum clock frequency set in the third IP block 253.

In an embodiment, when the first voltage level is less than or equal to the first threshold voltage after the first time elapses, the CPU 240 may decrease at least one of the first maximum clock frequency, the second maximum clock frequency, the third maximum clock frequency, and/or the fourth maximum clock frequency by the value stored in the register in the processor 120 or the set rate. In an embodiment, for example, when the first voltage level is less than or equal to the first threshold voltage after the first time elapses, the CPU 240 may decrease at least one of the first maximum clock frequency, the second maximum clock frequency, the third maximum clock frequency, and/or the fourth maximum clock frequency by half.

In an embodiment, the CPU 240 may decrease at least one of the first maximum clock frequency, the second maximum clock frequency, the third maximum clock frequency, and/or the fourth maximum clock frequency to decrease a voltage drop which occurs in the CPU 240, the first IP block 251, the second IP block 252, and/or the third IP block 253. The CPU 240 may decrease at least one of the first maximum clock frequency, the second maximum clock frequency, the third maximum clock frequency, and/or the fourth maximum clock frequency to decrease a voltage drop of the battery 189. The CPU 240 may decrease the voltage drop of the battery 189 to maintain the first voltage level, which is the voltage level of the battery 189, to be higher than the first threshold voltage. The CPU 240 may maintain the voltage level of the battery 189 to be higher than the first threshold voltage, thus reducing the SMPL reset occurrence. The CPU 240 may maintain the voltage level of the battery 189 to be higher than the first threshold voltage, thus reducing that the auto ship mode occurs. Thus, the CPU 240 may decrease a phenomenon where the electronic device 101 is turned off when the electronic device 101 is in use, thus increasing the usage stability of the electronic device 101.

Figure 3:
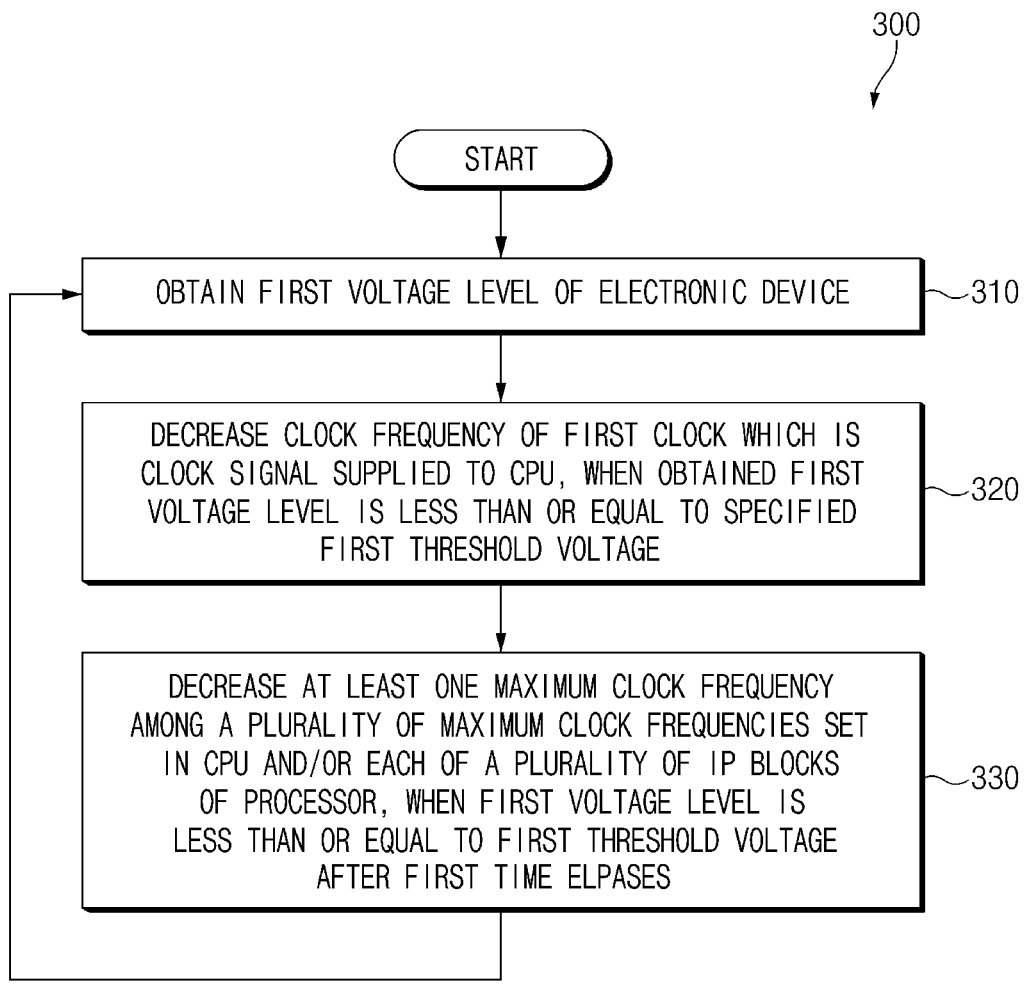
FIG. 3 is a flowchart illustrating a control method of an electronic device according to an embodiment.

FIG. 3 is a flowchart 300 illustrating a control method of an electronic device (e.g., an electronic device 101 of FIG. 2) according to an embodiment.

In operation 310, a processor (e.g., a processor 120 of FIG. 2) of the electronic device 101 according to an embodiment may obtain a first voltage level of the electronic device 101. The first voltage level may be a voltage level of a battery (e.g., a battery 189 of FIG. 2). A CPU (e.g., a CPU 240 of FIG. 2) of the processor 120 may perform first control for a voltage acquisition unit (e.g., a voltage acquisition unit 210 of FIG. 2) in the processor 120. The CPU 240 may measure a voltage of an output terminal of the battery 189 using the voltage acquisition unit 210.

In operation 320, when the first voltage level is less than or equal to a specified first threshold voltage, the processor 120 of the electronic device 101 according to an embodiment may decrease a clock frequency of a first clock which is a clock signal supplied to the CPU 240 of the processor 120 of the electronic device 101. The CPU 240 of the processor 120 may perform second control for a voltage comparison unit (e.g., the voltage acquisition unit 210 of FIG. 2) in the processor 120. When the first voltage level is less than or equal to the specified first threshold voltage, the processor 120 may decrease the clock frequency of the first clock by a value stored in a register in the processor 120 or a set rate.

In operation 330, when the first voltage level is less than or equal to a first threshold voltage after a first time elapses, the processor 120 of the electronic device 101 according to an embodiment may decrease at least one maximum clock frequency selected from a plurality of maximum clock frequencies set in the CPU 240 and/or each of the plurality of IP blocks (e.g., a first IP block 251, a second IP block 252, and a third IP block 253 of FIG. 2). The CPU 240 of the processor 120 may perform third control for a clock controller (e.g., a clock controller 230 of FIG. 2) in the processor 120. When the first voltage level is less than or equal to the first threshold voltage after the first time elapses, the CPU 240 may decrease at least one of a first maximum clock frequency, a second maximum clock frequency, a third maximum clock frequency, and/or a fourth maximum clock frequency using the clock controller 230.

Figure 4:
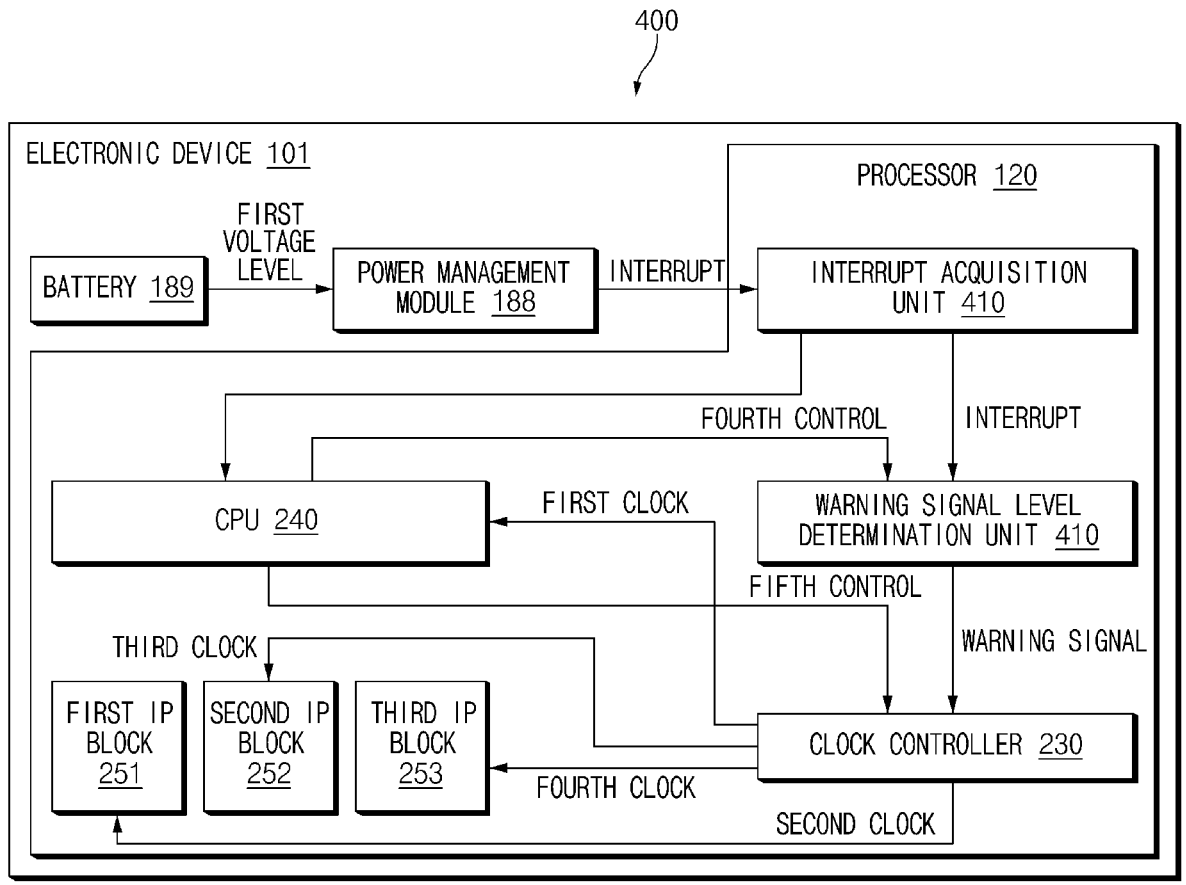
FIG. 4 is a drawing illustrating an electronic device including a battery, a power management module, and a processor according to an embodiment.

FIG. 4 is a drawing 400 illustrating an electronic device 101 including a battery 189, a power management module 188, and a processor 120 according to an embodiment. The power management module 188 may be a power management integrated circuit (PMIC). The processor 120 may include an interrupt acquisition unit 410, a warning signal level determination unit 420, a clock controller 230, a CPU 240, a first IP block 251, a second IP block 252, and/or a third IP block 253.

In an embodiment, the power management module 188 may obtain a first voltage level. The first voltage level may be a voltage level of the battery 189. The power management module 188 may measure a voltage of an output terminal of the battery 189. The power management module 188 may generate an interrupt signal associated with the first voltage level. The power management module 188 may deliver the interrupt signal to the processor 120.

In an embodiment, when the first voltage level is less than or equal to a specified first threshold voltage, the interrupt signal may be enabled (e.g., in an enable state). In an embodiment, when the first voltage level is in a voltage level range when the electronic device 101 performs a general operation, the interrupt signal may be in a high state. In such an embodiment, the interrupt signal may be enabled while changing from the high state to a low state when the first voltage level is less than or equal to the specified first threshold voltage.

In an embodiment, the interrupt acquisition unit 410 may receive the interrupt signal. The interrupt acquisition unit 410 may be implemented as an interrupt acquisition pin and/or terminal. The processor 120 may obtain the interrupt signal enabled when the first voltage level is less than or equal to the first threshold voltage from the power management module 188 to obtain the first signal level. When the interrupt signal is not in an enable state, the processor 120 may determine that the first voltage level is higher than the first threshold voltage. When the interrupt signal is in the enable state, the processor 120 may determine that the first voltage level is less than or equal to the first threshold voltage. The interrupt acquisition unit 410 may deliver the interrupt signal to the warning signal level determination unit 420.

In an embodiment, the warning signal level determination unit 420 may be subject to fourth control from the CPU 240. For example, the fourth control may be performed by means of an interrupt handler. However, the CPU 240 is not limited thereto, and alternatively, the fourth control may be performed using the power management module 188. The warning signal level determination unit 420 may set a level of a warning signal. The warning signal may provide a notification that the first voltage level is less than or equal to the first threshold voltage. The warning signal may provide a notification that SMPL reset is applicable when the first voltage level is less than or equal to the first threshold voltage. When the first voltage level is less than or equal to the first threshold voltage, the warning signal level determination unit 420 may change a level of the warning signal. When the first voltage level is less than or equal to the first threshold voltage, the warning signal level determination unit 420 may change the level of the warning signal from a high level to a low level. The warning signal level determination unit 420 may deliver the warning signal to the clock controller 230.

In an embodiment, the clock controller 230 may be subject to fifth control from the CPU 240. For example, the fifth control may be performed by means of the interrupt handler. However, the CPU 240 is not limited thereto, and alternatively, the fifth control may be performed using the power management module 188. The clock controller 230 may receive the warning signal. The clock controller 230 may determine whether the first voltage level is less than or equal to the first threshold voltage based on (or depending on) the level of the warning signal. When determining that the first voltage level is less than the first threshold voltage, the clock controller 230 may decrease at least one of a first maximum clock frequency, a second maximum clock frequency, a third maximum clock frequency, and/or a fourth maximum clock frequency.

In an embodiment, the CPU 240 may set each of the plurality of maximum clock frequencies by means of DVFS. The clock controller 230 may set a maximum clock frequency for the CPU 240 to the first maximum clock frequency. The clock controller 230 may control a first clock supplied to the CPU 240 in a way such that a maximum clock frequency of the first clock is not greater than the first maximum clock frequency. The clock controller 230 may set a maximum clock frequency for the first IP block 251 to the second maximum clock frequency. The clock controller 230 may control a second clock supplied to the first IP block 251 in a way such that a maximum clock frequency of the second clock is not greater than second first maximum clock frequency. The clock controller 230 may set a maximum clock frequency for the second IP block 252 to the third maximum clock frequency. The clock controller 230 may control a third clock supplied to the second IP block 252 in a way such that a maximum clock frequency of the third clock is not greater than the third maximum clock frequency. The clock controller 230 may set a maximum clock frequency for the third IP block 253 to the fourth maximum clock frequency. The clock controller 230 may control the fourth clock in a way such that a maximum clock frequency of a fourth clock supplied to the third IP block 253 is not greater than the fourth maximum clock frequency. When determining that the first voltage level is less than the first threshold voltage after a first time elapses, the clock controller 230 may decrease at least one of the first maximum clock frequency, the second maximum clock frequency, the third maximum clock frequency, and/or the fourth maximum clock frequency.

Figure 5:
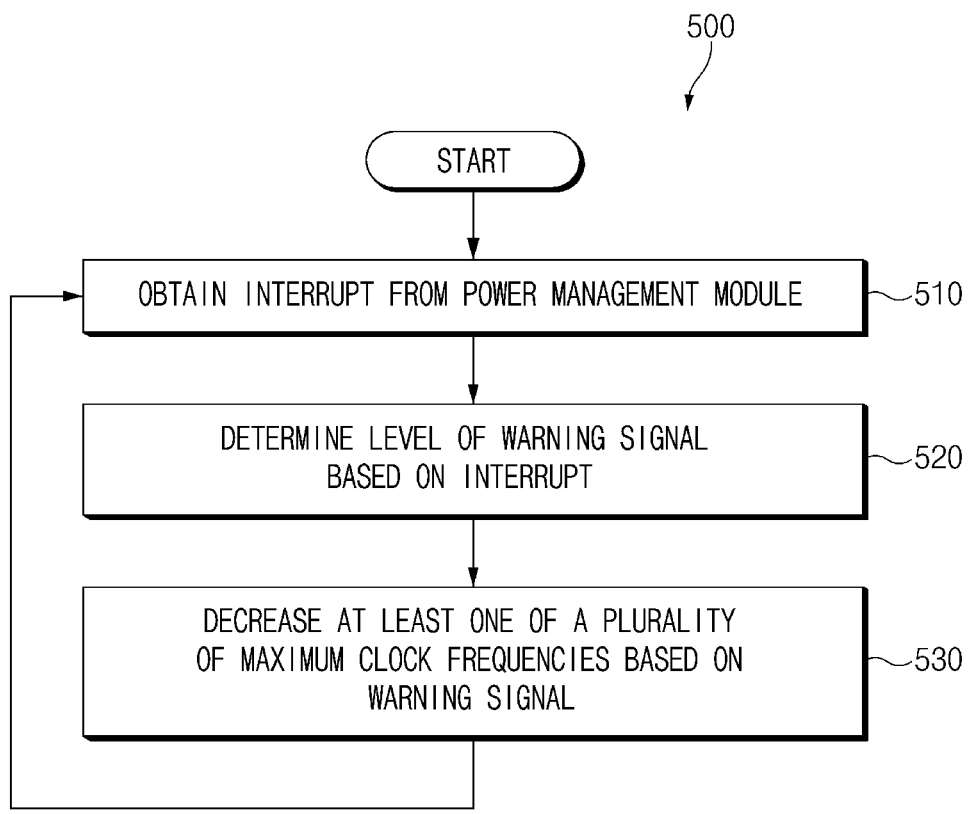
FIG. 5 is a flowchart illustrating a control method of an electronic device according to an embodiment.

FIG. 5 is a flowchart 500 illustrating a control method of an electronic device (e.g., an electronic device 101 of FIG. 4) according to an embodiment.

In operation 510, a processor (e.g., a processor 120 of FIG. 4) of the electronic device 101 according to an embodiment may obtain an interrupt (e.g., a signal indicating the interrupt or an interrupt signal) from a power management module (e.g., a power management module 188 of FIG. 4). When a level of an interrupt signal is a low level, the processor 120 may determine that a first voltage level is less than or equal to a first threshold voltage. The first voltage level may be a voltage level of a battery (e.g., a battery 189 of FIG. 4).

In operation 520, the processor 120 of the electronic device 101 according to an embodiment may determine a level of a warning signal based on the interrupt. The CPU 240 of the processor 120 may perform fourth control for a warning signal level determination unit (e.g., a warning signal level determination unit 420 of FIG. 4) based on the interrupt. When it is determined that the first voltage level is less than or equal to the first threshold voltage, the warning signal level determination unit 420 may activate the warning signal. When the level of the interrupt signal is the low level, the warning signal level determination unit 420 may change the level of the warning signal to the low level.

In operation 530, the processor 120 of the electronic device 101 according to an embodiment may decrease at least one maximum clock frequency among a plurality of maximum clock frequencies based on the warning signal. When the first voltage level is less than or equal to the first threshold voltage, the CPU 240 of the processor 120 may perform fifth control for a clock controller (e.g., a clock controller 230 of FIG. 4). The clock controller 230 may decrease a maximum clock frequency by a value stored in a register in the processor 120 or a set rate. For example, when the first voltage level is less than or equal to the first threshold voltage, the clock controller 230 may decrease the maximum clock frequency by half.

Figure 6:
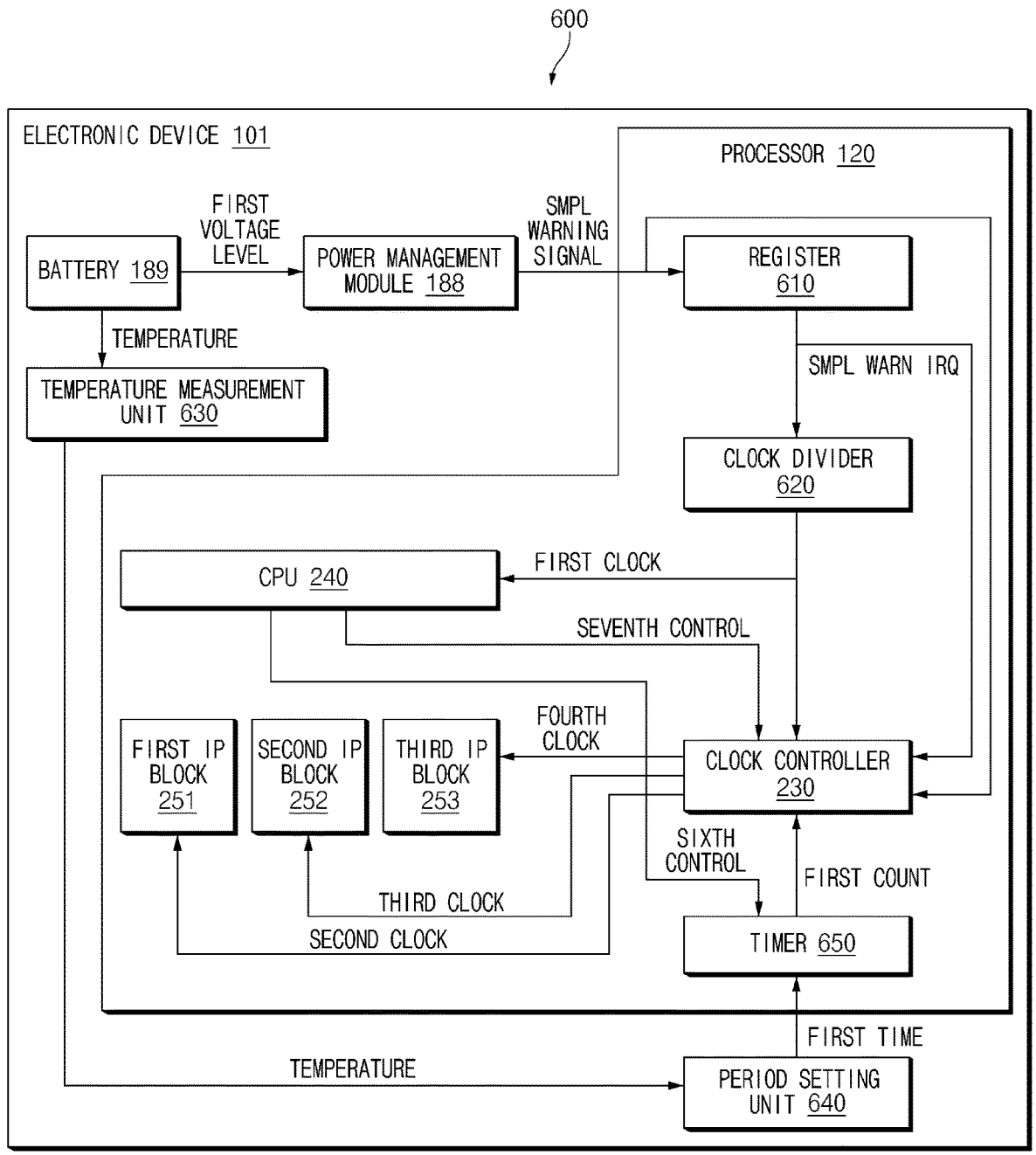
FIG. 6 is a drawing illustrating an electronic device including a battery, a power management module, a processor, a temperature measurement unit according to an embodiment.

FIG. 6 is a drawing 600 illustrating an electronic device 101 including a battery 189, a power management module 188, a processor 120, and a temperature measurement unit 630 according to an embodiment.

In an embodiment, the power management module 188 may measure a first voltage level. The first voltage level may be a voltage level of the battery 189. When the first voltage level is less than or equal to a first threshold voltage, the power management module 188 may generate an SMPL warning signal. The SMPL warning signal may be a warning signal for allowing the processor 120 to adjust a clock before the electronic device 101 is turned off, when SMPL reset occurs. When the first voltage level is less than or equal to the first threshold voltage, a level of the SMPL warning signal may change. For example, when the first voltage level is less than or equal to the first threshold voltage, the level of the SMPL warning signal may change from a high level to a low level. The power management module 188 may deliver the SMPL warning signal to a register 610 of the processor 120.

In an embodiment, the register 610 may receive the SMPL warning signal. The register 610 may generate an SMPL warning interrupt request SMPL WARN IRQ in response to the SMPL warning signal, e.g., depending on the level of the SMPL warning signal. The register 610 may deliver the SMPL warning interrupt request to a clock divider 620 of the processor 120. The register 610 may deliver the SMPL waring interrupt request to the clock controller 230.

In an embodiment, the clock divider 620 may control a first clock in response to the SMPL waring interrupt request. When the SMPL waring interrupt request is received, the clock divider 620 may decrease a clock frequency of the first clock supplied to the CPU 240. In an embodiment, for example, the clock divider 620 may decrease the clock frequency of the first clock by half when the SMPL waring interrupt request is received.

In an embodiment, the clock controller 230 may receive the SMPL waring interrupt request. The clock controller 230 may receive information associated with a time point when the clock frequency of the first clock decreases by half from the clock divider 620. The clock controller 230 may identify whether the SMPL waring interrupt request is maintained after a first time elapses (or a first time duration) from the time point when the clock divider 620 decreases the clock frequency of the first clock by half.

In an embodiment, the temperature measurement unit 630 measures a temperature of the battery 189. The temperature measurement unit 630 may measure a temperature around the battery 189. The temperature measurement unit 630 may include a thermistor. In an embodiment, the temperature measurement unit 630 may be disposed independently of the processor 120. The temperature measurement unit 630 may be disposed adjacent to the battery 189. The temperature measurement unit 630 may deliver the temperature of the battery 189 to a period setting unit 640.

In an embodiment, the period setting unit 640 may set (or determine a value, e.g., a time duration, of) the first time. The period setting unit 640 may be disposed independently of the processor 120. However, the period setting unit 640 is not limited thereto, and alternatively, the period setting unit 640 may be included in the processor 120. The period setting unit 640 may receive the temperature of the battery 189 at the first time. The period setting unit 640 may deliver the set first time to a timer 650.

In an embodiment, the period setting unit 640 may set the first time based on (e.g., depending on or corresponding to) the temperature of the battery 189. When the temperature of the battery 189 is greater than or equal to a first temperature, the period setting unit 640 may determine the temperature of the battery 189 as a room temperature state. Here, the room temperature may be in a range of about 15° C. to about 25° C., for example, in a range of about 20° C. to about 25° C. When the temperature of the battery 189 is less than the first temperature, the period setting unit 640 may determine the temperature of the battery 189 as a low temperature state. Here, the low temperature may be a predetermined temperature which is lower (e.g., substantially lower) than the room temperature. The period setting unit 640 may set the first time to a first value in the room temperature state. The period setting unit 640 may set the first time to a second value in the low temperature state.

In an embodiment, the first value may be set according to a time when the electronic device 101 is turned off by an SMPL reset operation or an auto ship mode in the room temperature state. The second value may be set according to a time when the electronic device 101 is turned off by the SMPL reset operation or the auto ship mode in the low temperature state. In an embodiment, for example, the electronic device 101 may be turned off after about 100 milliseconds (ms) when the first voltage level is less than the first threshold voltage in the room temperature state. In an embodiment, for example, the electronic device 101 may be turned off after about 1 second when the first voltage level is less than the first threshold voltage in the low temperature state. When the time when the first voltage level is less than the first threshold voltage is maintained during about 10% of the time when the electronic device 101 is turned off, the period setting unit 640 may determine that the first time elapses. Thus, the period setting unit 640 may set the first value to be 10 ms and may set the second value to be 100 ms.

In an embodiment, the timer 650 may be subject to sixth control from a CPU 240. For example, the sixth control may be performed by means of an interrupt handler. However, the CPU 240 is not limited thereto, and alternatively, the sixth control may be performed using the power management module 188. The timer 650 may receive the set first time from the period setting unit 640. The timer 650 may be included in the processor 120. However, the timer 650 is not limited thereto, and alternatively, the timer 650 may be disposed independently of the processor 120. The timer 650 may measure a time which elapses from a time point when the first time is received from the period setting unit 640.

In an embodiment, the timer 650 may be replaced with (or defined by) a counter or may be disposed together with the counter in the processor 120. The counter (not shown) may calculate the count of decrease in the maximum clock frequency. In an embodiment where only the timer 650 is disposed, the timer 650 may continuously measure a time which elapses from the time point when the first time is received. In an embodiment where only the counter is disposed, the counter may discontinuously measure a time point which elapses from the time point when the first time is received. In an embodiment where both the timer 650 and the counter are included, timer 650 and the counter may more accurately measure a time which elapses from the time point when the first time is received and a threshold time point. In an embodiment, for example, where only the counter is disposed, the counter may have a value which increases whenever a certain period elapses from the time point when the first time is received from the period setting unit 640.

In an embodiment, the clock controller 230 may be subject to seventh control from the CPU 240. For example, the seventh control may be performed by means of the interrupt handler. However, the CPU 240 is not limited thereto, and alternatively, the seventh control may be performed using the power management module 188. When the SMPL waring interrupt request is maintained even after the first time elapses, the clock controller 230 may decrease maximum clock frequencies of at least one selected from the CPU 240, a first IP block 251, a second IP block 252, and a third IP block 253.

In an embodiment, the CPU 240 of the processor 120 may decrease maximum clock frequencies of at least one selected from the CPU 240, the first IP block 251, the second IP block 252, and the third IP block 253 when the first time elapses using the clock controller 230. The counter (not shown) may calculate the count of decrease in the maximum clock frequency. The CPU 240 may calculate the count of decrease in the maximum clock frequency by means of the counter. For example, whenever the maximum clock frequency decreases one time, the timer 650 may increase the count of decrease by one time.

In an embodiment, the CPU 240 of the processor 120 may calculate the count of decrease in the maximum clock frequency by means of the counter. When the count of decrease measured by the counter is less than a specified first count and when the first time elapses, the CPU 240 of the processor 120 may decrease a first maximum clock frequency. When the count of decrease in the maximum clock frequency in the counter is less than the specified first count and when the first time elapses, the CPU 240 of the processor 120 may increase the number of decrease (or decreases). The first count may be a count previously stored in the register 610 to decrease the first maximum clock frequency. In an embodiment, for example, when the first maximum clock frequency is desired to be controlled 10 times, the register 610 may store the first count as 10 times. When the count of decrease measured by the timer 650 is less than 10 times, the CPU 240 may decrease the first maximum clock frequency.

In an embodiment, when the count of decrease in the maximum clock frequency, which is measured by the timer 650, is greater than or equal to the first count and when the first time elapses, the CPU 240 of the processor 120 may decrease the first maximum clock frequency, a second maximum clock frequency, a third maximum clock frequency, and a fourth maximum clock frequency, which are maximum clock frequencies respectively set to the CPU 240, the first IP block 251, the second IP block 252, and the third IP block 253. For example, when the count of decrease in the maximum clock frequency is greater than or equal to the first count, the CPU 240 may decrease all the first maximum clock frequency, the second maximum clock frequency, the third maximum clock frequency, and the fourth maximum clock frequency. When the count of decrease in the maximum clock frequency in the counter is greater than or equal to the first count and when the first voltage level is less than or equal to the first threshold voltage, the CPU 240 may determine all the CPU 240, the first IP block 251, the second IP block 252, and the third IP block 253 as a state requiring control to prevent the electronic device 101 from being turned off.

In an embodiment, when the count of decrease in the maximum clock frequency in the counter is greater than or equal to the first count and is less than or equal to a second count greater than the first count and when the voltage level of the battery 189 is less than or equal to a first threshold voltage, the processor 120 may decrease the first maximum clock frequency and the second maximum clock frequency. When the count of decrease in the counter is greater than or equal to the second count and is less than or equal to a third count greater than the second count and when the first voltage level is less than or equal to the first threshold voltage, the CPU 240 may decrease the first maximum clock frequency, the second maximum clock frequency, and the third maximum clock frequency. When the count of decrease in the counter is greater than or equal to the third count and when the first voltage level is less than or equal to the first threshold voltage, the CPU 240 may decrease the first maximum clock frequency, the second maximum clock frequency, the third maximum clock frequency, and the fourth maximum clock frequency. The more the count of decrease in the maximum clock frequency in the counter increases, the more the CPU 240 may additionally control the maximum clock frequency to prevent the electronic device 101 from being turned off.

In an embodiment, the CPU 240 of the processor 120 may decrease the at least one maximum clock frequency, stage by stage, in proportion to the count of lapse of the first time. The CPU 240 may decrease the at least one maximum clock frequency by one step by a rate or a value stored in the register 610. For example, the CPU 240 may decrease the at least one maximum clock frequency stage by half in proportion to the count of lapse of the first time. The processor 120 may decrease at least one selected from the first maximum clock frequency, the second maximum clock frequency, the third clock frequency, and the fourth maximum clock frequency by half in proportion to the count of lapse of the first time.

In an embodiment, the CPU 240 of the processor 120 may be configured to decrease a maximum clock frequency set in an IP block with higher current consumption among the plurality of IP blocks 251, 252, and 253. For example, the third IP block 253 may consume the most current, the second IP block 252 may consume the next most current, and the first IP block 251 may consume the least current. When the count of decrease in the maximum clock frequency in the counter is greater than or equal to the first count and is less than or equal to the second count greater than the first count and when the voltage level of the battery 189 is less than or equal to the first voltage, the CPU 240 may decrease the fourth maximum clock frequency set in the third IP block 253. When the count of decrease in the maximum clock frequency in the counter is greater than or equal to the second count and is less than or equal to the third count greater than the second count and when the voltage level of the battery 189 is less than or equal to the first voltage, the CPU 240 may additionally decrease the third maximum clock frequency set in the second IP block 252. When the count of decrease in the maximum clock frequency in the counter is greater than or equal to the third count and when the voltage level of the battery 189 is less than or equal to the first voltage, the CPU 240 may additionally decrease the second maximum clock frequency set in the first IP block 251.

Figure 7:
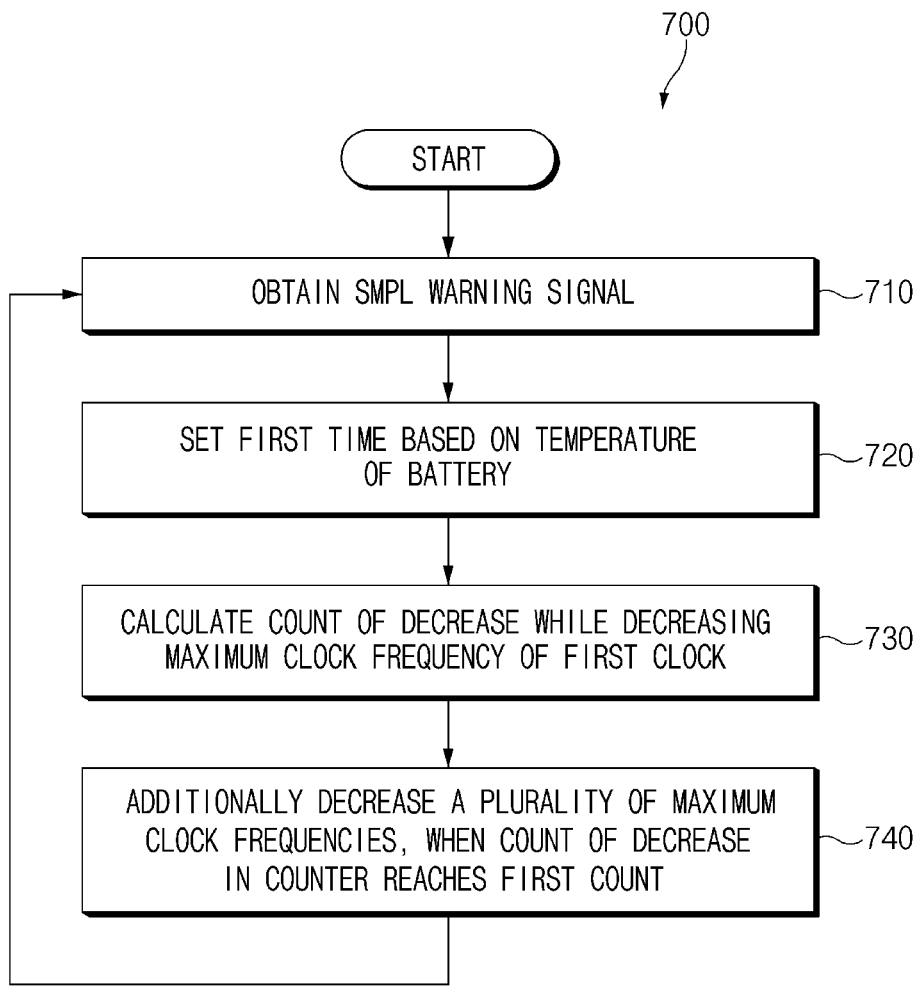
FIG. 7 is a flowchart illustrating a control method of an electronic device according to an embodiment.

FIG. 7 is a flowchart 700 illustrating a control method of an electronic device (e.g., an electronic device 101 of FIG. 6) according to an embodiment.

In operation 710, a processor (e.g., a processor 120 of FIG. 6) of the electronic device 101 according to an embodiment may obtain an SMPL warning signal. When a first voltage level is less than or equal to a first threshold voltage, a power management module 188 may change a level of the SMPL warning signal to activate the SMPL warning signal. The first voltage level may be a voltage level of a battery (e.g., a battery 189 of FIG. 6). When receiving the activated SMPL warning signal, a CPU 240 of the processor 120 may determine that the first voltage level is less than or equal to the first threshold voltage.

In operation 720, the electronic device 101 according to an embodiment may set a first time based on a temperature of the battery 189. A temperature measurement unit (e.g., a temperature measurement unit 630 of FIG. 6) may measure a temperature of the battery 189. A period setting unit 640 may receive the temperature of the battery 189 and may set the first time. The period setting unit 640 may set the first time to be proportional to a time taken until the electronic device 101 is turned off based on the temperature of the battery 189. In an embodiment, for example, when the battery 189 is in a room temperature mode and when the time taken until the electronic device 101 is turned off is about one second, the period setting unit 640 may set the first time to 100 ms. In an embodiment, for example, when the battery 189 is in a low temperature mode and when the time taken until the electronic device 101 is turned off is about 100 ms, the period setting unit 640 may set the first time to 10 ms.

In operation 730, the processor 120 of the electronic device 101 according to an embodiment may calculate the count of decrease while decreasing a maximum clock frequency of a first clock. When the voltage of the battery 189 is less than or equal to the first voltage, the CPU 240 of the processor 120 may decrease a first maximum clock frequency. The CPU 240 may count the count of decrease in the first maximum clock frequency by means of a counter.

In operation 740, when the count of decrease in the counter reaches a first count, the processor 120 of the electronic device 101 according to an embodiment may additionally decrease a plurality of maximum clock frequencies. When the first voltage level is less than or equal to the first threshold voltage until the count of decrease in the maximum clock frequency in the counter reaches the first count, the CPU 240 of the processor 120 may perform additional control of maximum clock frequencies set in a first IP block 251, a second IP block 252, and a third IP block 253.

Figure 8:
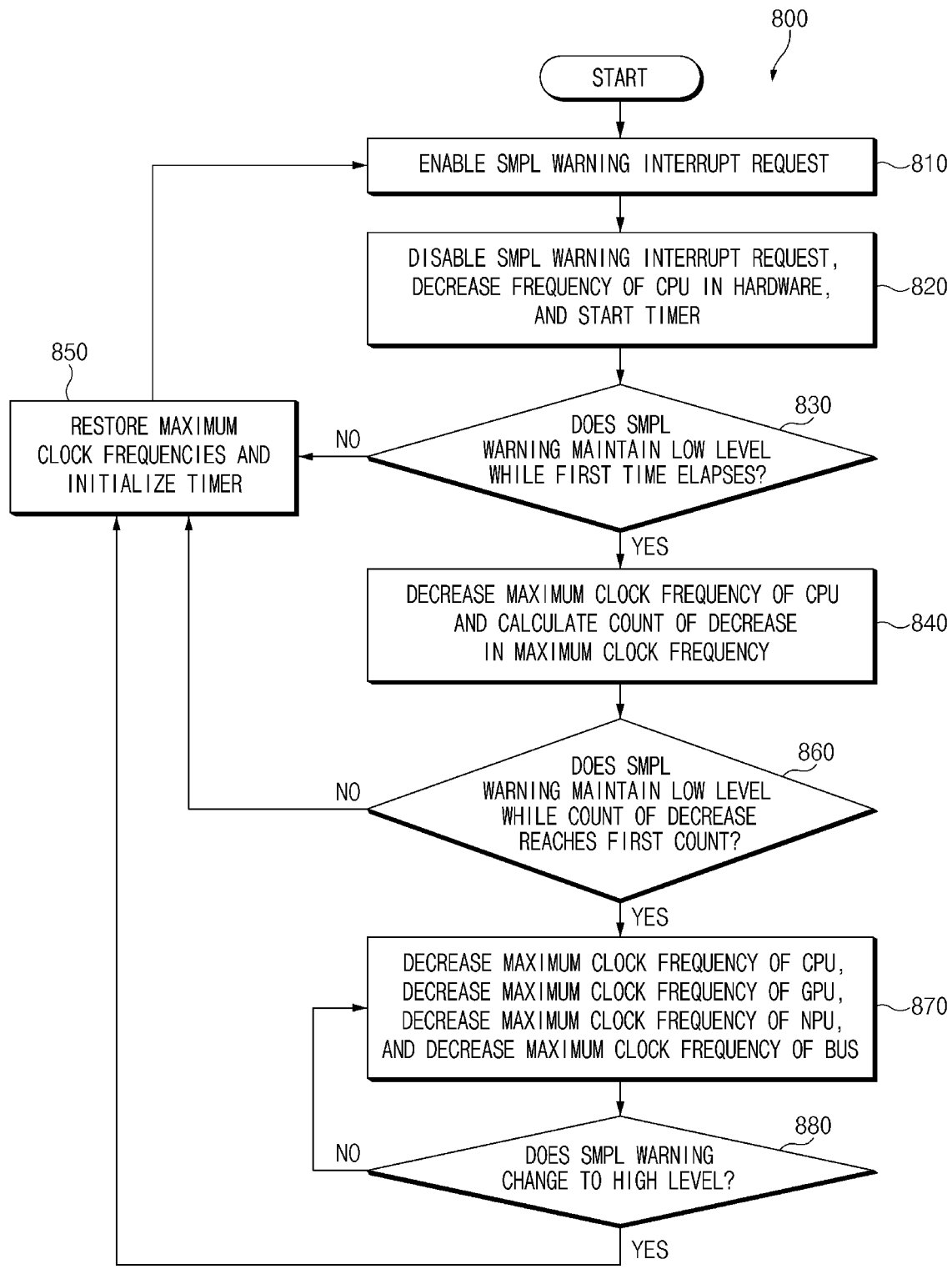
FIG. 8 is a flowchart illustrating a control method of an electronic device according to an embodiment.

FIG. 8 is a flowchart 800 illustrating a control method of an electronic device (e.g., an electronic device 101 of FIG. 6) according to an embodiment.

In operation 810, the electronic device 101 according to an embodiment may enable an SMPL waring interrupt request. A power management module (e.g., a power management module 188 of FIG. 6) may measure a first voltage level. The first voltage level may be a voltage level of a battery (e.g., a battery 189 of FIG. 6). When the first voltage level is less than or equal to a first threshold voltage, the power management module 188 may deliver an SMPL warning signal indicating that SMPL reset is able to occur to a processor (e.g., a processor 120 of FIG. 6). When receiving the SMPL warning signal, the processor 120 may change a level of the SMPL waring interrupt request. In an embodiment, for example, when receiving the SMPL warning signal, the processor 120 may change the level of the SMPL waring interrupt request from a high level to a low level.

In operation 820, the electronic device 101 according to an embodiment may disable the SMPL waring interrupt request. When receiving the SMPL waring interrupt request, the processor 120 of the electronic device 101 may determine that the first voltage level is less than or equal to the first threshold voltage to generate an SMPL warning signal. When generating the SMPL warning signal, the processor 120 may restore the SMPL waring interrupt request to a disabled state.

In operation 820, the electronic device 101 according to an embodiment may decrease a frequency of a CPU (e.g., a CPU 240 of FIG. 6) in hardware and may start a timer (e.g., a timer 650 of FIG. 6). The processor 120 may decrease a frequency of a clock supplied to the CPU by a value or rate specified in a register (e.g., a register 610 of FIG. 6). The processor 120 may start a counter of the timer 650 for performing additional control of a maximum clock frequency of the clock.

In operation 830, the electronic device 101 according to an embodiment may identify whether the SMPL warning maintains the low level while a first time elapses. When the first voltage level maintains the state where the first voltage level is less than or equal to the first threshold voltage, the SMPL warning may maintain the low level. When the SMPL warning maintains the low level, the CPU 240 of the processor 120 may determine that additional control associated with the first voltage level is desired to be performed. When the SMPL warning maintains the low level while the first time elapses (operation 830—YES), the CPU 240 may proceed to operation 840. When the SMPL warning changes to the high level before the first time elapses (operation 830—NO), the CPU 240 may proceed to operation 850.

In operation 840, the electronic device 101 according to an embodiment may decrease a maximum clock frequency of the CPU 240. The CPU 240 of the processor 120 may decrease a first maximum clock frequency set by means of DVFS in the CPU 240. The CPU 240 may decrease the first maximum clock frequency whenever the first time elapses. The CPU 240 may decrease the first maximum clock frequency by the specified value or the specified rate. In an embodiment, for example, the CPU 240 may decrease the first maximum clock frequency by half.

In operation 840, the electronic device 101 according to an embodiment may calculate the count of decrease in the maximum clock frequency. The counter may calculate the count of decrease in the maximum clock frequency. When decreasing the first maximum clock frequency, the CPU 240 of the processor 120 may calculate the count of decrease in the maximum clock frequency by means of the counter. As the first time elapses, the CPU 240 may increase the number of decrease (or decreases) in the counter by one time.

In operation 850, the electronic device 101 according to an embodiment may restore the maximum clock frequency and may initialize the timer 650. When the SMPL warning changes to the high level, the CPU 240 of the processor 120 may determine that the first voltage level is greater than the first threshold voltage. When the first voltage level is greater than the first threshold voltage, the CPU 240 may determine that the voltage of the battery 189 returns to a normal range. When the first voltage level is greater than the first threshold voltage, the CPU 240 may be configured to initialize a plurality of maximum clock frequencies set by means of the DVFS. When the first voltage level is greater than the first threshold voltage, the CPU 240 may restore the maximum clock frequency set in the CPU 240 to an original value.

In operation 860, the electronic device 101 according to an embodiment may identify whether the SMPL warning maintains the low level while the count of decrease reaches a first count. When the first voltage level maintains the state where the first voltage level is less than or equal to the first threshold voltage, the SMPL warning may maintain the low level. When the SMPL warning maintains the low level until the count of decrease in the maximum clock frequency measured by the timer 650 reaches the first count, the processor 120 may determine that additional control of a plurality of IP blocks (e.g., a first IP block 251, a second IP block 252, and a third IP block 253) in addition to the CPU 240 may be desired to be performed. When the SMPL warning maintains the low level while the count of decrease reaches the first count (operation 860—YES), the processor 120 may proceed to operation 870. When the SMPL warning changes to the high level before the count of decrease reaches the first count (operation 860—NO), the processor 120 may proceed to operation 850.

In operation 870, the electronic device 101 according to an embodiment may decrease the maximum clock frequency of the CPU 240. The CPU 240 of the processor 120 may decrease the first maximum clock frequency set by means of the DVFS in the CPU 240. The CPU 240 may decrease the first maximum clock frequency whenever the first time elapses. The CPU 240 may decrease the first maximum clock frequency by the specified value or the specified rate. In an embodiment, for example, the CPU 240 may decrease the first maximum clock frequency by half.

In operation 870, the electronic device 101 according to an embodiment may decrease a maximum clock frequency of a GPU (e.g., the first IP block 251 of FIG. 6). The CPU 240 of the processor 120 may decrease a second maximum clock frequency set by means of the DVFS in the GPU 251. The CPU 240 may decrease the second maximum clock frequency together with the first maximum clock frequency.

However, the CPU 240 is not limited thereto, and alternatively, the CPU 240 may set the second maximum clock frequency independently of the first maximum clock frequency. The CPU 240 may decrease the second maximum clock frequency whenever the first time elapses. The CPU 240 may decrease the second maximum clock frequency by the specified value or the specified rate. In an embodiment, for example, the CPU 240 may decrease the second maximum clock frequency by half.

In operation 870, the electronic device 101 according to an embodiment may decrease a maximum clock frequency of an NPU (e.g., the second IP block 252 of FIG. 6). The CPU 240 of the processor 120 may decrease a third maximum clock frequency set by means of the DVFS in the NPU 252. The CPU 240 may decrease the third maximum clock frequency together with the first maximum clock frequency and the second maximum clock frequency. However, the CPU 240 is not limited thereto, and alternatively, the CPU 240 may set the third maximum clock frequency independently of the first maximum clock frequency and/or the second maximum clock frequency. The CPU 240 may decrease the third maximum clock frequency whenever the first time elapses. The CPU 240 may decrease the third maximum clock frequency by the specified value or the specified rate. In an embodiment, for example, the CPU 240 may decrease the third maximum clock frequency by half.

In operation 870, the electronic device 101 according to an embodiment may decrease a maximum clock frequency of a bus (e.g., the third IP block 253 of FIG. 6). The CPU 240 of the processor 120 may decrease a fourth maximum clock frequency set by means of the DVFS in the bus 253. The CPU 240 may decrease the fourth maximum clock frequency together with the first maximum clock frequency, the second maximum clock frequency, and the third maximum clock frequency. However, the CPU 240 is not limited thereto, and alternatively, the CPU 240 may set the fourth maximum clock frequency independently of the first maximum clock, the second maximum clock frequency, and/or the third maximum clock frequency. The CPU 240 may decrease the fourth maximum clock frequency whenever the first time elapses. The CPU 240 may decrease the fourth maximum clock frequency by the specified value or the specified rate. In an embodiment, for example, the CPU 240 may decrease the fourth maximum clock frequency by half.

In operation 880, the electronic device 101 according to an embodiment may identify whether the SMPL warning changes to the high level. When the first voltage level changes higher than the first threshold voltage, the SMPL warning may change to the high level. When the SMPL warning changes to the high level, the electronic device 101 may be determined that additional control of the CPU 240 and the plurality of IP blocks (e.g., the first IP block 251, the second IP block 252, and the third IP block 253 of FIG. 6) are desired not to be performed. When the SMPL warning changes to the high level (operation 880—YES), the processor 120 may proceed to operation 850. When the SMPL warning maintains the low level (operation 880—NO), the processor 120 may return to operation 870. Until the SMPL warning changes to the high level, the CPU 240 may decrease maximum clock frequencies of clocks set in the CPU 240 and the plurality of IP blocks 251, 252, and 253.

According to an embodiment, a timer (a timer 650 of FIG. 6) may be replaced with another counter (not shown). In an embodiment, for example, the processor 120 may count an internal or external clock of the processor 120 and may increase a value of another counter when there is a certain number. In an embodiment, for example, when another counter is greater than or equal to a specified count (e.g., 100 times) and when the first voltage level is less than or equal to the first threshold voltage, the electronic device 101 may decrease at least one maximum clock frequency selected from maximum clock frequencies set in the CPU 240 and/or the plurality of IP blocks 251, 252, and 253.

According to an embodiment, a counter (not shown) may be replaced with another timer. In an embodiment, for example, when the voltage level of the battery 189 is less than or equal to a second voltage and when a second time elapses, the processor 120 may additionally decrease maximum clock frequencies of the plurality of IP blocks 251, 252, and 253. in an embodiment, for example, when the voltage level of the battery 189 is less than or equal to a third voltage and when a third time elapses, the processor 120 may additionally decrease the maximum clock frequencies of the plurality of IP blocks 251, 252, and 253.

Figure 9:
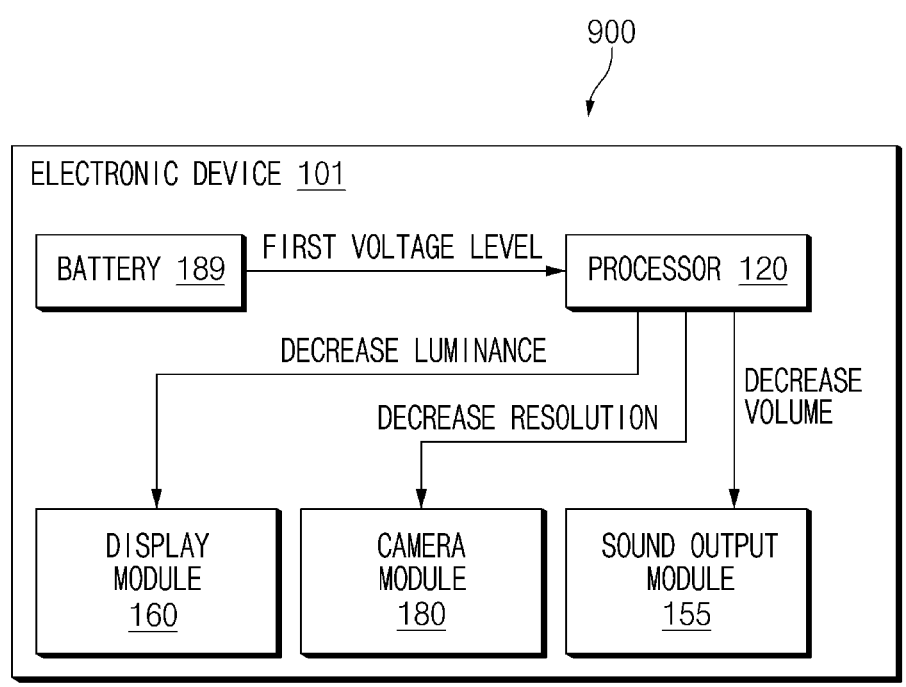
FIG. 9 is a drawing illustrating an electronic device including a battery, a processor, a display module, a camera module, and a sound output module according to an embodiment.

FIG. 9 is a drawing 900 illustrating an electronic device 101 including a battery 189, a processor 120, a display module 160, a camera module 180, and a sound output module 155 according to an embodiment.

In an embodiment, the electronic device 101 may further include a display (e.g., a display module 160), a camera (e.g., a camera module 180), and a speaker (e.g., a sound output module 155). The electronic device 101 may further include various modules for performing various functions.

In an embodiment, the processor 120 may obtain a first voltage level. The first voltage level may be a voltage level of the battery 189. The processor 120 may detect that the first voltage level is less than or equal to a first threshold voltage. The processor 120 may measure a time from a time point when the first voltage level is less than or equal to the first threshold voltage. The processor 120 may determine whether the first voltage level is less than or equal to the first threshold voltage and whether a first time elapses.

In an embodiment, when the first voltage level is less than or equal to the first threshold voltage after the first time elapses, the processor 120 may be configured to decrease at least one selected from a luminance of the display 160, resolution of the camera 180, and volume of the speaker 155. In an embodiment, when the first voltage level is less than or equal to the first threshold voltage after the first time elapses, the processor 120 may perform control for decreasing a load current of the battery 189. The processor 120 may decrease a luminance of the display 160 to decrease the load current of the battery 189. The processor 120 may decrease resolution of the camera 180 to decrease the load current of the battery 189. The processor 120 may decrease volume of the speaker 155 to decrease the load current of the battery 189. The processor 120 may control the display 160, the camera 180, and/or the speaker 155 to decrease the load current of the battery 189 such that the first voltage level maintains a state where the first voltage level is higher than the first threshold voltage.

An electronic device (e.g., an electronic device 101 of FIG. 1) according to various embodiments may include a processor (e.g., a processor 120 of FIG. 2) including a central processing unit (CPU) (e.g., a CPU 240 of FIG. 2) and a plurality of intellectual property (IP) blocks (e.g., a plurality of IP blocks 251, 252, and 253 of FIG. 2) and a memory (e.g., a memory 130 of FIG. 1) operationally connected with the processor 120. The memory 130 may store one or more instructions, when executed, causing the processor 120 to obtain a first voltage level of the electronic device 101 at a first time point, decrease a clock frequency of a first clock being a clock signal supplied to the CPU 240, when the obtained first voltage level is less than or equal to a specified first threshold voltage, obtain a second voltage level of the electronic device at a second time point after a first time (or a predetermined time) elapses; and decrease at least one maximum clock frequency selected from a plurality of maximum clock frequencies set in the CPU 240 and/or each of the plurality of IP blocks 251, 252, and 253, when the second voltage level is less than or equal to the first threshold voltage.

In an embodiment, the electronic device 101 may further include a battery (e.g., a battery 189 of FIG. 2). The first voltage level or the second voltage level may be a voltage of the battery 189.

In an embodiment, the memory 130 may further store instructions, when executed, causing the processor 120 to measure a voltage of an output terminal of the battery 189 using a voltage acquisition unit 210 to obtain the first voltage level or the second voltage level.

In an embodiment, the electronic device 101 may further include a power management module (e.g., a power management module 188 of FIG. 4). The memory 130 may further store instructions, when executed, causing the processor 120 to receive an interrupt signal enabled when the first voltage level or the second voltage level is less than or equal to the first threshold voltage from the power management module 188 to obtain the first voltage level or the second voltage level of the battery 189.

In an embodiment, the memory 130 may further store instructions, when executed, causing the processor 120 to set the first time based on a temperature of the battery 189.

In an embodiment, the memory 130 may further store instructions, when executed, causing the processor 120 to set each of the plurality of maximum clock frequencies by means of DVFS and decrease at least one or more of a first maximum clock frequency set in the CPU 240, a second maximum clock frequency set in a graphic processing unit (GPU) (e.g., a first IP block 251 of FIG. 2) among the plurality of IP blocks 251, 252, and 253, a third maximum clock frequency set in a neural processing unit (NPU) among the plurality of IP blocks 251, 252, and 253, and a fourth maximum clock frequency set in a bus (e.g., a third IP block 253 of FIG. 2) among the plurality of IP blocks 251, 252, and 253, when the second voltage level is less than or equal to the first threshold voltage at the second time point after the first time (or the predetermined time) elapses.

In an embodiment, the memory 130 may further store instructions, when executed, causing the processor 120 to calculate the count of decrease in the first maximum clock frequency while decreasing the first maximum clock frequency, when the first elapses, and decrease the first maximum clock frequency, the second maximum clock frequency, the third maximum clock frequency, and the fourth maximum clock frequency, when the count of decrease is greater than or equal to a first count.

In an embodiment, the memory 130 may further store instructions, when executed, causing the processor 120 to decrease a maximum clock frequency set in an IP block with higher current consumption among the plurality of IP blocks 251, 252, and 253.

In an embodiment, the memory 130 may further store instructions, when executed, causing the processor 120 to decrease the at least one maximum clock frequency, stage by stage, in proportion to the count of lapse of the first time.

In an embodiment, the memory 130 may further store instructions, when executed, causing the processor 120 to restore the at least one decreased maximum clock frequency when the second voltage level is greater than the first threshold voltage.

In an embodiment, the electronic device may further include a display (e.g., a display module 160 of FIG. 9), a camera (e.g., a camera module 180 of FIG. 9), and a speaker (e.g., a sound output module 155 of FIG. 9). The memory 130 may further store instructions, when executed, causing the processor 120 to decrease at least one selected from a luminance of the display 160, resolution of the camera 180, and volume of the speaker 155, when the second voltage level is less than or equal to the first threshold voltage at the second time point after the first time elapses.

A control method of an electronic device 101 according to various embodiments may include obtaining a first voltage level of the electronic device 101 (operation 310 of FIG. 3) at a first time point, decreasing a clock frequency of a first clock being a clock signal supplied to a CPU 240 of a processor 120 of the electronic device 101, when the obtained first voltage level is less than or equal to a specified first threshold voltage (operation 320 of FIG. 3), obtaining a second voltage level of the electronic device at a second time point after a first time (or a predetermined timed) elapses, and decreasing at least one maximum clock frequency selected from a plurality of maximum clock frequencies set in the CPU 240 and/or each of a plurality of IP blocks 251, 252, and 253 of the processor 120, when the obtained second voltage level is less than or equal to the first threshold voltage (operation 330 of FIG. 3).

In an embodiment, the first voltage level or the second voltage level may be a voltage level of a battery 189.

In an embodiment, the obtaining the first voltage level (operation 310) or the second voltage level may include measuring a voltage of an output terminal of the battery 189 using a voltage acquisition unit 210 in the processor 120.

In an embodiment, the obtaining the first voltage level (operation 310) or the second voltage level may include obtaining an interrupt signal enabled when the first voltage level or the second voltage level is less than or equal to the first threshold voltage from a power management module 188 of the electronic device 101. The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one selected from A and B," "at least one of A or B," "A, B, or C," "at least one of A, B, and C," "at least one selected from A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., module or program) according to various embodiments may be made up of a singular or a plurality of entities, and some of the aforementioned sub-components may be omitted, or other sub-components may be further included in various embodiments. Alternatively or additionally, some components (e.g., modules or programs) may be integrated into one entity, performing the same or similar functions performed by respective corresponding components before integration. According to various embodiments, operations performed by a module, program, or another component may be sequentially, parallelly, repeatedly, or heuristically executed, at least some operations may be executed in a different order, omitted, or other operations may be added.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device, comprising:
a processor including a central processing unit (CPU) and a plurality of intellectual property (IP) blocks; and
a memory operationally connected with the processor,
wherein the memory stores one or more instructions, when executed, causing the processor to:
obtain a first voltage level of the electronic device at a first time point;
decrease a clock frequency of a first clock, which is a clock signal supplied to the CPU, when the obtained first voltage level is less than or equal to a specified first threshold voltage;
obtain a second voltage level of the electronic device at a second time point after a first time elapses from the first time point; and
decrease at least one selected from a first maximum clock frequency set in the CPU and a second maximum clock frequency set in a graphic processing unit (GPU) corresponding to a first IP block among of the plurality of IP blocks when the second voltage level is less than or equal to the first threshold voltage at the second time point,
wherein the memory further stores instructions, when executed, causing the processor to:
calculate a count of decrease in the first maximum clock frequency while decreasing the first maximum clock frequency, when the first time elapses; and
decrease the first maximum clock frequency and the second maximum clock frequency when the count of decrease is greater than or equal to a first count.

2. The electronic device of claim 1, further comprising:
a battery,
wherein the first voltage level or the second voltage level is a voltage of the battery.

3. The electronic device of claim 2, wherein the memory further stores instructions, when executed, causing the processor to:
measure a voltage of an output terminal of the battery using a voltage acquisition unit in the processor to obtain the first voltage level or the second voltage level.

4. The electronic device of claim 2, wherein the memory further stores instructions, when executed, causing the processor to:
set the first time based on a temperature of the battery.

5. The electronic device of claim 1, further comprising:
a power management module,
wherein the memory further stores instructions, when executed, causing the processor to:
receive an interrupt signal, which is enabled when the first voltage level or the second voltage level is less than or equal to the first threshold voltage, from the power management module to obtain the first voltage level or the second voltage level.

6. The electronic device of claim 1, wherein the memory further stores instructions, when executed, causing the processor to:

set each of the first maximum clock frequency and the second maximum clock frequency by means of the dynamic voltage frequency scaling (DVFS).

7. The electronic device of claim 1, wherein the memory further stores instructions, when executed, causing the processor to:
decrease a maximum clock frequency set in the first IP block or one of the at least one second IP block among of the plurality of IP blocks with higher current consumption among the first IP block and the at least one second IP block.

8. The electronic device of claim 1, wherein the memory further stores instructions, when executed, causing the processor to:
decrease the at least one maximum clock frequency, stage by stage, in proportion to a count of lapse of the first time.

9. The electronic device of claim 1, wherein the memory further stores instructions, when executed, causing the processor to:
restore the at least one decreased maximum clock frequency, when the second voltage level is greater than the first threshold voltage.

10. The electronic device of claim 1, further comprising:
a display;
a camera; and
a speaker,
wherein the memory further stores instructions, when executed, causing the processor to:
decrease at least one selected from a luminance of the display, resolution of the camera, and volume of the speaker, when the second voltage level is less than or equal to the first threshold voltage at the second time point after the first time elapses.

11. A control method of an electronic device, the control method comprising:
obtaining a first voltage level of the electronic device at a first time point;
decreasing a clock frequency of a first clock, which is a clock signal supplied to a CPU of a processor of the electronic device, when the obtained first voltage level is less than or equal to a specified first threshold voltage;
obtaining a second voltage level of the electronic device at a second time point after a first time elapses from the first time point;
decreasing at least one maximum clock frequency selected from a plurality of maximum clock frequencies, which are set in the CPU and a plurality of IP blocks of the processor by means of dynamic voltage frequency scaling (DVFS) in a frequency range of a clock signal applied thereto, when the obtained second voltage level is less than or equal to the first threshold voltage, wherein each of the plurality of maximum clock frequencies is a maximum clock frequency value of a dynamic voltage frequency scaling (DVFS) policy applied to the CPU or an IP block of the plurality of IP blocks, to which the clock signal is supplied; and
decreasing at least one selected from a first maximum clock frequency set in the CPU and a second maximum clock frequency set in a graphic processing unit (GPU) corresponding to a first IP block among of the plurality of IP blocks when the second voltage level is less than or equal to the first threshold voltage at the second time point,
wherein the decreasing at least one selected from the first maximum clock frequency and the second maximum clock frequency comprises:
calculating a count of decrease in the first maximum clock frequency while decreasing the first maximum clock frequency, when the first time elapses,
decreasing the first maximum clock frequency and the second maximum clock frequency when the count of decrease is greater than or equal to a first count.

12. The control method of claim 11, wherein the first voltage level or the second voltage level is a voltage level of a battery of the electronic device.

13. The control method of claim 12, wherein the obtaining the first voltage level or the second voltage level includes:
measuring a voltage of an output terminal of the battery using a voltage acquisition unit in the processor.

14. The control method of claim 11, wherein the obtaining the first voltage level or the second voltage level includes:
obtaining an interrupt signal, which is enabled when the first voltage level or the second voltage level is less than or equal to the first threshold voltage, from a power management module of the electronic device.

* * * * *